(12) United States Patent
Bantle et al.

(10) Patent No.: US 8,123,005 B2
(45) Date of Patent: Feb. 28, 2012

(54) END-STOP DAMPER

(75) Inventors: Ulrich Bantle, Empfingen (DE); Jürgen Eschle, Aichhalden (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 861 days.

(21) Appl. No.: 11/793,176

(22) PCT Filed: Nov. 19, 2005

(86) PCT No.: PCT/EP2005/012406
§ 371 (c)(1),
(2), (4) Date: Jun. 14, 2007

(87) PCT Pub. No.: WO2006/063657
PCT Pub. Date: Jun. 22, 2006

(65) Prior Publication Data
US 2008/0217126 A1    Sep. 11, 2008

(51) Int. Cl.
*F16F 9/56* (2006.01)
*F16F 1/10* (2006.01)
(52) U.S. Cl. ............ 188/282.7; 188/322.15; 267/156; 267/118; 267/124; 16/66; 16/84
(58) Field of Classification Search ......... 188/282.7, 188/322.15; 267/64.26, 226, 156, 118, 124; 16/66, 84
See application file for complete search history.

(56) References Cited

U.S. PATENT DOCUMENTS

| | | | | |
|---|---|---|---|---|
| 2,410,716 A | * | 11/1946 | Ellis et al. | 188/269 |
| 3,666,256 A | * | 5/1972 | Ellis et al. | 267/34 |
| 4,044,865 A | * | 8/1977 | Tourunen | 188/287 |
| 4,110,868 A | | 9/1978 | Imazaike | |

(Continued)

FOREIGN PATENT DOCUMENTS
AT     004910 U1 *   1/2001
(Continued)

OTHER PUBLICATIONS

"Shock Absorber with Additional Break Effect," IBM Technical Disclosure Bulletin, IBM Corp., New York, US, vol. 37, No. 7, Jul. 1, 1994, p. 143.

*Primary Examiner* — Bradley King
*Assistant Examiner* — Mahbubur Rashid
(74) *Attorney, Agent, or Firm* — Pauley Petersen & Erickson

(57) ABSTRACT

An end-stop damper including a damper body in the form of a cylinder, wherein a piston is guided so that it is displaceable in the cylinder receiving chamber. An air pressure is formed in the receiving chamber produces a braking force acting on the piston during its displacement. The receiving chamber includes at least one pressure reducing opening and the piston includes a bellows section which is actively connected to the cylinder according to pressure conditions in the receiving chamber. This invention substantially simplifies the structural design of the end-stop damper because the piston and the bellows section are connected to each other so that they are formed in one piece.

20 Claims, 2 Drawing Sheets

U.S. PATENT DOCUMENTS

| | | | |
|---|---|---|---|
| 4,500,075 A * | 2/1985 | Tsuchiya et al. | 267/226 |
| 4,760,768 A * | 8/1988 | Yamamoto | 84/236 |
| 4,796,732 A * | 1/1989 | Kong | 188/282.8 |
| 4,877,226 A | 10/1989 | Taylor | |
| 5,217,212 A * | 6/1993 | Chorkey et al. | 267/226 |
| 5,370,429 A * | 12/1994 | Reuber et al. | 293/119 |
| 2002/0170794 A1 * | 11/2002 | Dubach | 188/381 |

FOREIGN PATENT DOCUMENTS

| | | |
|---|---|---|
| DE | 4009034 A1 * | 9/1991 |
| DE | 102 51 169 A1 | 5/2004 |
| DE | 103 13 659 B3 | 9/2004 |
| DE | 10313659 B3 * | 9/2004 |
| DE | 202004019395 U1 * | 5/2005 |
| DE | 102004044898 A1 * | 7/2005 |
| EP | 0 841 451 A2 | 5/1998 |
| EP | 1260159AA2 * | 11/2002 |
| WO | WO 03/100287 A1 | 12/2003 |
| WO | WO 2004067988 A1 * | 8/2004 |
| WO | WO 2005/054614 A1 | 6/2005 |

* cited by examiner

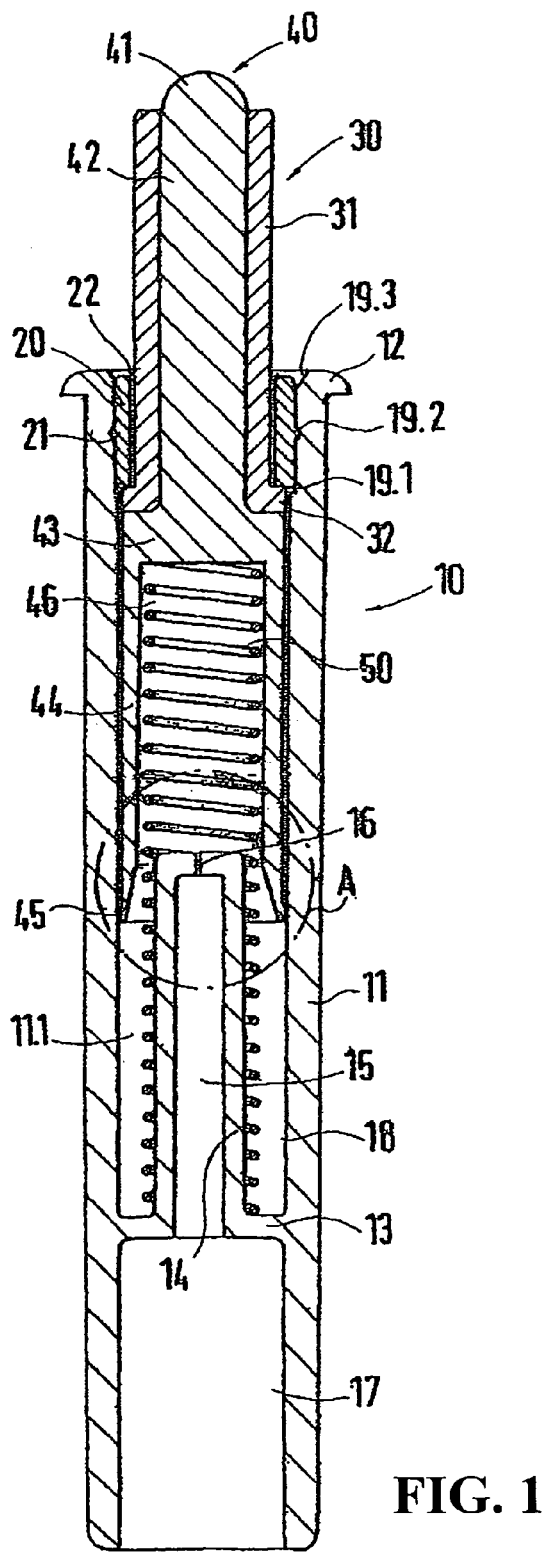
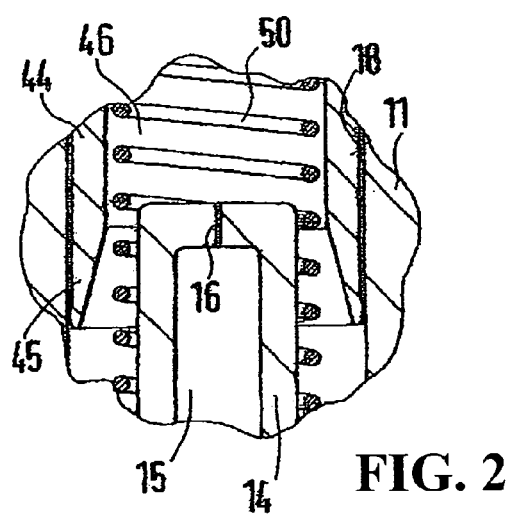
FIG. 1
FIG. 2

END-STOP DAMPER

BACKGROUND OF THE INVENTION

1. Field of the Invention

This invention relates to an end-stop damper with a damper body having a cylinder, wherein a piston is displaceably guided in a receiving chamber of the cylinder, a braking force acting on the piston is exerted by air pressure generated in the receiving chamber during displacement of the piston, the receiving chamber has at least one opening for relieving the air pressure, and the piston has a bellows section in operational connection with the cylinder as a function of the pressure conditions in the receiving chamber.

2. Discussion of Related Art

An end-stop damper is taught by German Patent Reference DE 103 13 659 B3. The end-stop damper has a cylinder in which a piston is guided in a linearly displaceable manner. Here, the piston is sealingly conducted on the inner wall of the cylinder, so that two pressure chambers are formed in the cylinder.

When retracting the piston, air is compressed in an overpressure chamber. At the same time an air pressure, which is less than the pressure in the overpressure chamber, is generated in an underpressure chamber. For allowing a continuous pressure compensation to occur between these two pressure chambers, overflow conduits of a narrow cross section are provided.

Air flows through these conduits from the overpressure chamber to the underpressure cylinder. For increasing the braking force, the piston has a bellows section which is inflated because of a difference in pressure existing between the overpressure chamber and the underpressure chamber. During this it rests against the inner wall of the cylinder and thus increases the friction of the piston. The bellows section is made as a sleeve of a flexible material. The piston is designed in two parts for fixing the bellows section in place, and the bellows section is clamped between the parts of the piston.

The known end-stop damper has a multitude of parts and the assembly is complicated.

SUMMARY OF THE INVENTION

It is one object of this invention to provide an end-stop damper of the type mentioned above but which has a simple construction.

This object is achieved if the piston and the bellows section are connected with each other in one piece. The one-piece embodiment of the bellows section and the piston reduces the cost outlay for parts and assembly. In particular, the cost outlay for sealing required for sealing the bellows section against the piston, is reduced in comparison with the prior art.

This invention recognizes the structural elements of bellows section and the piston, which customarily are made of different materials and are employed for completely different purposes, can be combined into one unit.

The structural cost outlay can be even more reduced if the piston rod is formed in one piece on the piston.

In one embodiment of this invention, a support body is assigned to the piston rod or has a support body. The support body has a detent side arranged outside the damper body. The support body is supported on the piston by a shoulder. Depending on the layout, the piston rod can be stiffened by the support body. At the same time, it is possible to absorb the impact force, of a striking door or a leaf, for example, and to transmit it at least in part directly to the piston.

This is a particular advantage if the piston and the bellows section include a flexible material. In that case, the piston is charged by the impact force in a spring-elastic manner, and a portion of the impact force is destroyed by hysteresis.

The flexible embodiment of the piston and the bellows section also make possible a pairing with the materials of the cylinder, which allow strong damping because of large coefficients of friction. If the piston rod is made of a flexible material, for reasons of rigidity, the piston rod is stiffened by a sheath element.

In one embodiment of this invention, on a side facing away from the piston, the piston rod forms an impact element made of a flexible material. The impact force can be absorbed through the impact element and can be partially damped.

If the bellows section has a cylinder-shaped portion maintained a distance away from the inner wall of the cylinder, and the area surrounded by the cylinder-shaped portion is assigned to a pressure chamber of the cylinder, the bellows section can rest continuously against the inner wall of the cylinder when charged with pressure, and can create a uniform and large braking force.

The functionality of the bellows section can also be increased if the cylinder-shaped portion of the bellows section forms a spring receptacle, in which a spring is at least partially received. The spring can support the piston against the cylinder in a direction opposite the insertion movement of the piston into the cylinder.

A structural simplification results if the bellows section supports a sealing element formed on it, which seals a pressure chamber and an underpressure chamber of the cylinder against each other.

The braking effect of the end-stop damper can be increased if both the underpressure chamber and the pressure chamber are in an air-conducting connection with their surroundings by at least one opening.

This is possible if the openings, or damping members assigned to the openings, are designed to achieve a metered air flow.

For example, it is possible to achieve an air volume flow for controlled pressure reduction and simultaneously good damping if at least one of the openings has a diameter D<0.2 mm, preferably <0.1 mm. Diameters <0.1 mm, in particular, have a good damping effect for application in furniture construction.

It is possible to achieve this damping satisfactorily if the ratio of the cross-sectional surface of the piston in the area facing the hollow chamber, to the opening cross section of the opening is greater than 4000/1.

BRIEF DESCRIPTION OF THE DRAWINGS

This invention is described in greater detail in view of an exemplary embodiment represented in the drawings, wherein:

FIG. 1 shows an end-stop damper in a lateral sectional view;

FIG. 2 shows a detailed sectional view, identified by "A" in FIG. 1;

DETAILED DESCRIPTION OF THE INVENTION

Figure 3:
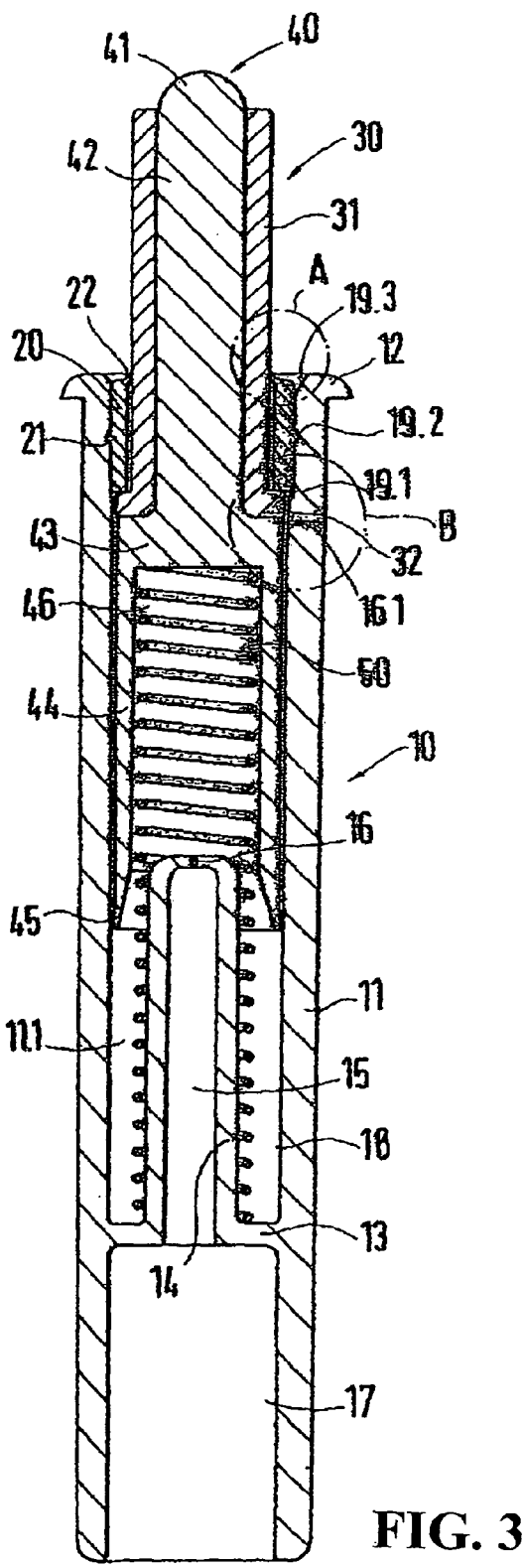
FIG. 3 shows a further embodiment of an end-stop damper in a lateral sectional view.

An end-stop damper with a longitudinally extending damping body 10 is shown in FIG. 1. The damping body 10 comprises a cylinder 11. The cylinder 11 surrounds a receiving chamber 11.1, in which a piston 43 of a sliding element 40 is maintained in a linearly displaceable manner. A spring guide element 14, which is formed as one piece on a bottom 13 of the damping body 10, protrudes into the receiving chamber 11.1. In the area of or near its side facing away from the bottom 13, the spring guide element 14 has an opening 16 in the form of a bore. The opening 16 creates a spatial connection between the receiving chamber 11.1 and an air-guidance channel 15 surrounded by the spring guide element.

In this case, the diameter of the opening is less than 0.1 mm in order to permit a metered air exchange between the receiving chamber 1.1 and the air-guidance channel 15. However, in place of a bore, any desired other opening or cross section can be used. Good damping results are achieved if the cross-sectional surface of the piston 43 in the end area facing the receiving chamber 11.1 to the opening cross section of the opening has a ratio of 4000/1.

The air-guidance channel 15 terminates in a hollow space 17 formed by a cylinder-shaped end section of the damper body 10. The damper body 10 is embodied as an injection-molded part. For reasons of removal from the mold, the inner wall 18 of the cylinder 11 has a slight opening cone, so that the receiving chamber 11.1 slightly widens in the direction toward the inlet opening located opposite the bottom 13.

As mentioned above, a sliding element 40 is guided in the receiving chamber 11.1. The sliding element 40 is of one-piece construction and comprises a piston rod 42, the piston 43 and a bellows section 44. The sliding element 40 is also embodied as an injection-molded part and is made of a flexible material, for example a TPE material.

The piston rod 42 is formed on the piston 43 on the side located opposite the bellows section 44 and projects out of the receiving chamber 11.1 of the damper body 11. On an end it has an impact element 41 embodied as an end cap.

In an alternative embodiment, it is possible to omit the piston rod 42 formed on the piston 43. In that case, the piston rod 42 is formed by the support 30 alone.

A mechanical connection between the piston 43 and the support body 30 is not required with the present structure. However, centering of these two components can be advantageous. The piston rod 42 is enclosed in a support body 30 and can have a hollow-cylindrical receptacle, with a cross section matched to the exterior cross section of the piston rod 42. It is formed by a sheath element 31. The material of the support body 30 is rigid, so that the piston rod 42 is stiffened. As shown in FIG. 1, a radially widened shoulder 32 of the support body 30 supports it on the piston 43. The shoulder 32 can guide the piston 43. In that case, it is radially widened so that, together with the inner wall 18 of the receiving chamber 11.1, it forms a guide. Depending on the layout of the shoulder 32, it is possible to minimize the danger of tilting of the piston 43, in particular. The bellows section 44 projects into the receiving chamber 11.1. It is formed as a hollow cylinder, preferably of constant wall thickness, so that it has identical workpiece properties over its circumference, in particular a uniform expansion behavior. However, the wall can also be embodied to be spherical or, for achieving a varied force, can have a variable cross section. For example, a reduced cross section can be employed. On its free open end, the bellows section 44 has a circumferential sealing element 45, which sealingly rests against the inner wall 18 of the receiving chamber 11.1 with a sealing lip. In this case, the sealing element 45 is embodied so that it provides sealing over the entire sliding area and, based on the elasticity of its material, compensates the opening cone of the receiving chamber 11.1.

The detailed representation of FIG. 2 shows the exact design of the sealing element 45. The bellows section 44 encloses a spring receptacle 46, into which a spring 50 is placed. The spring receptacle 46 is dimensioned so that it prevents kinking of the spring 50.

With one of its ends, the spring 50 is supported on the piston 43. The other spring end rests on the bottom 13. The spring 50 is placed over the spring guide element 14, which also prevents kinking of the spring 50. The spring receptacle 46 is embodied so that, during insertion of the sliding element 40, the spring guide element 14 and the spring 50 are accommodated in it and the piston movement is not thus hindered.

A detent element 20 is used for fixing the sliding element 40 in place in the extended end position represented in FIG. 1. This is embodied as a ring and has a circumferentially extending bead-like shoulder 21 on its outer circumference. The detent element 20 has a hollow-cylindrical passage 22, through which the sheath element 31 of the support body 30 is passed. In this case, the outer diameter of the sheath element 31 is matched to the inner diameter of the passage, so that a stable linear guidance for the support body 30 results. Here, the pairing of the material of the support body 30 and the detent element 20 is selected so that a smooth-running seating results. During assembly, the detent element 20 can be easily inserted into the receiving chamber 11.1 via an insertion widening 19.3 of the damper body 10. The insertion movement is limited by a shoulder 19.1 of the damper body 10. In its assembled position, the detent element 20 snaps into the snap-in receptacle 19.2 with its snap-in shoulder 21.

In the end position represented in FIG. 1, the detent element 20 supports the support body 30 against the shoulder 32, and thus the piston 43 against the pretension of the spring 50.

The mode of functioning of the end-stop damper, which is for example employed in a piece of furniture with a leaf hinged on it, will now be briefly described.

The furniture body of the piece of furniture customarily has a receiver bore into which the cylindrical outer contour of the damper body 10 can be inserted. During this, the flange 12 of the damper body 10 rests against the furniture body in the area of or near the receiving bore.

The closing leaf first impacts the impact element 41 of the piston rod 42. The mechanical impact noise of the leaf is compensated because of the resilient material properties of the impact body 41. The impact body 41 is deformed as a function of the impact energy of the leaf. With a strong impact, the impact body 41 is completely deformed into the sheath element 31 and the leaf comes into contact with the free end of the sheath element 31. The force is transmitted to the piston 43 via the piston rod 42, or the sheath element 31. The annular contact of the shoulder 32 with the piston 43 assures an even force introduction. Depending on the strength of the impact energy, a portion of the energy can be damped as a result of the elastic deformation of the piston 43. The piston 43 is displaced into the receiving chamber 11.1 and pressure is built up in the receiving chamber 11.1, which is aided by the sealing effect of the seal 45. The pressure is simultaneously relieved via the opening 16. If pressure is built up in a short period of time, pressure relief does not take place in the same amount in which it is relieved via the opening 16.

A damping overpressure is generated in the receiving chamber 11.1. This overpressure acts on the bellows section 44. Because ambient pressure exists in the space between the inner wall 18 and the outer surface of the bellows section 44, a pressure gradient is created. This inflates the bellow section 44 so that it rests against the inner wall 18. In the process, it aids damping because of sliding friction. The friction is comparatively large because of the flexible material property of the bellows section 44.

The bellows section 44 returns into its starting position when the pressure gradient drops. Following the relief of the piston rod 42, the piston 43 returns into its initial position in accordance with FIG. 1, aided by the spring 50. During this, ambient air is aspirated into the receiving chamber 11.1 through the opening 16.

The opening is of such dimensions that properties of the end-stop damper are met, including controlled, slow pressure reduction for achieving proper damping, and rapid pressure equalization during return movement of the piston 43.

These properties can be optimally achieved under the conditions described in this specification and in the claims.

Figure 4:
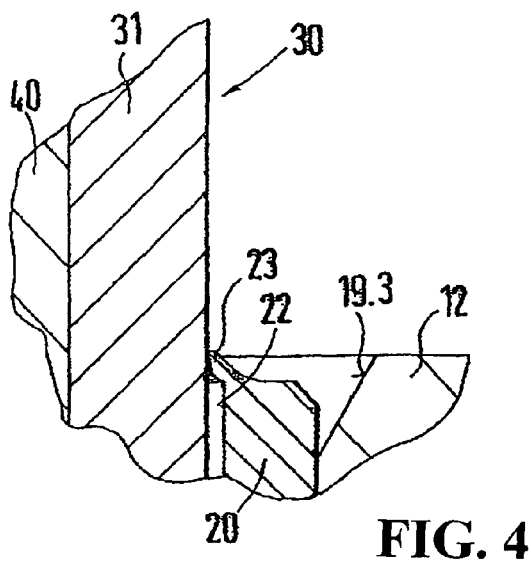
FIG. 4 shows a detailed view, identified by "A" in FIG. 3.
Figure 5:
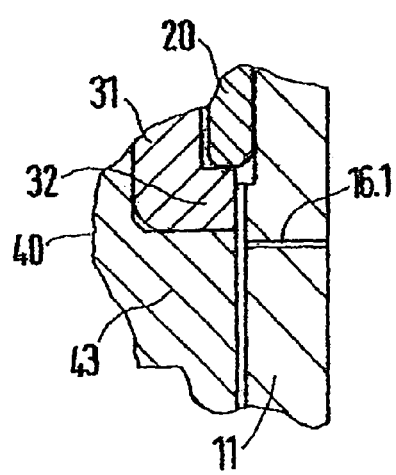
FIG. 5 shows a detailed view, identified by "B" in FIG. 1.

In another embodiment, an end-stop damper is shown in FIGS. 3 to 5. The structure substantially corresponds to the embodiment in accordance with FIGS. 1 and 2, so reference is made to the above explanations, and only the differences are addressed.

As the detail "A" in accordance with FIG. 2 shows, a seal 23 is provided in the area of or near the detent element 20, which seals the outer circumference of the sheath element 31 of the support body 30. Together with the seal 45 of the bellows section 44, an underpressure chamber 22 is created, which is sealed with respect to the surroundings. The seal 23 can be arranged at any other desired location for this purpose.

The underpressure chamber is in spatial connection with the surroundings via an opening 16.1, such as shown in FIG. 5. For a controlled pressure equalization, the opening 16.1 is designed as described in this specification and in the claims. While introducing the piston 43, a pressure, which is less than that of the surroundings, is formed in the underpressure chamber 22. Thus, a pressure gradient is created between the receiving chamber 11.1 and the underpressure chamber 22, which results in an expansion of the bellows section 44 with a strong braking effect.

In accordance with this invention, functioning of the end-stop damper is assured if, in accordance with the exemplary embodiment according to FIGS. 3 to 5, an underpressure chamber 22 is created and ambient pressure always exists in the receiving chamber 11.1, for example if the opening 16 has correspondingly large dimensions.

The invention claimed is:

1. An end-stop damper having a damper body (10) with a cylinder (11), the end-stop damper comprising:
   a sliding element having one-piece construction comprising an impact element (41), a piston rod (42), and a piston (43);
   a support body (30) having a first end toward the impact element (41) and a second end adjacent the piston (43), the support body including a sheath element (31) surrounding the piston rod (42) and spaced apart from an inner side wall (18) of the cylinder (11), wherein the impact element extends beyond the first end of the support body (30) and is at least partially deformable into the support body (30) upon impact, and the second end of the support body (30) comprises a radially widened shoulder (32) supporting the support body (30) on the piston (43);
   wherein the piston (43) and the sheath element (31) are displaceably guided in a receiving chamber (11.1) of the cylinder (11), a braking force acting on the piston (43) is exerted by an air pressure generated in the receiving chamber during displacement of the piston (43), the receiving chamber (11.1) is connected with a surroundings through at least one opening (16) for relieving the air pressure, and the piston (43) has a bellows section (44) in operational connection with the cylinder (11) as a function of pressure conditions in the receiving chamber (11.1), and the piston (43) and the bellows section (44) are connected with each other in one piece; and
   a ratio of a cross-sectional surface of the piston (43) in an area facing the hollow chamber to an opening cross section of the opening (16) being greater than 4000/1.

2. The end-stop damper in accordance with claim 1, wherein the impact element (41), piston (43) and the bellows section (44) are of a flexible material.

3. The end-stop damper in accordance with claim 2, wherein the piston rod (42) is stiffened by the sheath element (31).

4. The end-stop damper in accordance with claim 3, wherein the bellows section (44) has a cylinder-shaped portion maintained a distance away from the inner side wall of the cylinder (11), and an area surrounded by the cylinder-shaped portion is assigned to a pressure chamber of the cylinder (11).

5. The end-stop damper in accordance with claim 4, wherein the cylinder-shaped portion of the bellows section (44) forms a spring receptacle (46) in which a spring (50) is at least partially received, and the spring (50) supports the piston (43) against the cylinder in a direction opposite an insertion movement of the piston (43) into the cylinder (11).

6. The end-stop damper in accordance with claim 5, wherein the bellows section (44) supports a formed sealing element (45) which seals a pressure chamber and an underpressure chamber of the cylinder (11) against each other.

7. The end-stop damper in accordance with claim 6, wherein the underpressure chamber and the pressure chamber are in an air-conducting communication with surroundings by at least one opening (16, 16.1).

8. The end-stop damper in accordance with claim 7, wherein at least one of the openings (16, 16.1) has a diameter less than 0.2 mm.

9. The end-stop damper in accordance with claim 8, wherein the opening (16, 16.1) has a diameter less than 0.2 mm.

10. The end-stop damper in accordance with claim 1, wherein the piston rod (42) is stiffened by the sheath element (31).

11. The end-stop damper in accordance with claim 1, wherein the impact element (41) is made of a flexible material.

12. The end-stop damper in accordance with claim 1, wherein the bellows section (44) has a cylinder-shaped portion maintained a distance away from the inner side wall of the cylinder (11), and an area surrounded by the cylinder-shaped portion is assigned to a pressure chamber of the cylinder (11).

13. The end-stop damper in accordance with claim 1, wherein the bellows section (44) supports a formed sealing element (45) which seals a pressure chamber and an underpressure chamber of the cylinder (11) against each other.

14. The end-stop damper in accordance with claim 1, wherein the underpressure chamber and the pressure chamber are in an air-conducting communication with surroundings by at least one opening (16, 16.1).

15. The end-stop damper in accordance with claim 1, wherein at least one of the openings (16, 16.1) has a diameter less than 0.2 mm.

16. The end-stop damper in accordance with claim 1, wherein the opening (16, 16.1) has a diameter less than 0.2 mm.

17. The end-stop damper in accordance with claim 1, wherein the bellows section (44) comprises a flexible material inflatable for operational connection with the cylinder wall (11.1).

18. The end-stop damper in accordance with claim 1, wherein the bellows section (44) forms a spring receptacle (46) in which a spring (50) is at least partially received, and the spring (50) supports the piston (43) against the cylinder in a direction opposite an insertion movement of the piston (43) into the cylinder (11).

19. The end-stop damper in accordance with claim 1, wherein the radially widened shoulder (32) extends toward the inner side wall (18) of the receiving chamber (11.1) of the cylinder (11), and further comprising a detent element extending along the inner side wall (18) of the receiving chamber (11.1) at an end of the receiving chamber (11.1) and supporting the radially widened shoulder (32), wherein an outer diameter of the sheath (31) is matched to an inner diameter of the detent element.

20. The end-stop damper in accordance with claim 19, wherein the bellows section (44) forms a spring receptacle (46) in which a spring (50) is at least partially received, and the spring (50) supports the piston (43) against the cylinder in a direction opposite an insertion movement of the piston (43) into the cylinder (11), wherein the spring pushes the shoulder (32) against the detent element (20).

\* \* \* \* \*